United States Patent [19]

Margison et al.

[11] 4,224,526

[45] Sep. 23, 1980

[54] PREFABRICATED HYDRO-ELECTRIC GENERATING STATION

[75] Inventors: Arthur D. Margison, Toronto; William T. Trick, Clinton, both of Canada

[73] Assignee: A. D. Margison Management Ltd., Toronto, Canada

[21] Appl. No.: 875,428

[22] Filed: Feb. 6, 1978

[51] Int. Cl.³ .............................. F03B 3/02
[52] U.S. Cl. ..................................... 290/52
[58] Field of Search ............... 290/1 R, 1 A, 52, 54

[56] References Cited

U.S. PATENT DOCUMENTS

| | | | |
|---|---|---|---|
| 2,783,392 | 2/1957 | Corbiere | 290/52 |
| 2,787,715 | 4/1957 | Danel | 290/52 |
| 3,184,218 | 5/1965 | Hochwalt et al. | 290/52 X |
| 3,372,645 | 3/1968 | Willi | 290/52 X |
| 4,117,676 | 10/1978 | Atencio | 290/52 X |

Primary Examiner—Gene Z. Rubinson
Assistant Examiner—W. E. Duncanson, Jr.
Attorney, Agent, or Firm—Fetherstonhaugh & Co.

[57] ABSTRACT

A prefabricated hydro-electric generating station comprising a vertical turbine having a Francis runner, a distributor and upper and lower stayvane rings with stayvanes extending therebetween; a generator and associated running gear for generating electrical power operatively connected to the Francis runner; a housing having walls mounted on said upper stayvane ring of said turbine and supporting said generator and running gear; said upper stayvane ring of said turbine providing vertical, lateral and torsional support for said housing generator and associated running gear mounted in said housing; said lower stayvane ring being adapted for mounting on a base to support said hydro-electric generating station in an operative position.

6 Claims, 5 Drawing Figures

PREFABRICATED HYDRO-ELECTRIC GENERATING STATION

This invention relates to a prefabricated hydro-electric generating station of a practical and economic design that can be factory assembled, shipped to a site and bodily installed on a rigid support.

There are remote sites capable of generating a useful amount of hydro-electric power that are not being used for this purpose because it is not economically feasible to develop them with existing station technology. Present practice of building a hydro-electric station is to separately ship the turbine generator and associated running gear to the site and assemble them at the site within a housing. The housing is usually built independently of the turbine and the turbine, generator and associated running gear are aligned at the site within the housing. The cost of building a remote small hydro-electric station in this way is usually so high that it is seldom done. Alternative methods of supplying power such as the use of fossil fueled prime movers and/or long and costly transmission lines are resorted to.

The present practice is wasteful of energy and in many cases relatively costly. There are sites that have low hydraulic heads that are capable of supplying power at a cost that is less then the presently available power supply subject to the availability of an inexpensive hydro-electric station. This invention provides a hydro-electric station that can be factory assembled, shipped to these low hydraulic head sites and installed to recover energy from these sites that is presently wasted because of the present cost of constructing a hydro-electric power station. The unit of the present invention can also be used in more accessible sites and could, in certain circumstances, be useful in the development of relatively low heads that are not presently being exploited for power. Here again, the development of these presently unused low heads is possible by reason of the economies achieved from the design of the hydro-electric generating station of this invention.

A hydro-electric station according to this invention comprises a vertical turbine having a Francis runner, a distributor, and upper and lower stayvane rings with stayvanes extending therebetween; a generator and associated running gear for generating electrical power operatively connected to the Francis runner; a housing having walls mounted on said upper stayvane ring of said turbine and supporting said generator and running gear; said upper stayvane ring of said turbine providing vertical, lateral and torsional support for said housing, generator and associated running gear mounted in said housing; said lower stayvane ring being adapted for mounting on a base to support said hydro-electric generating station in an operative position. The invention will be clearly understood after reference to the following detailed specification read in conjunction with the drawings.

Figure 1:
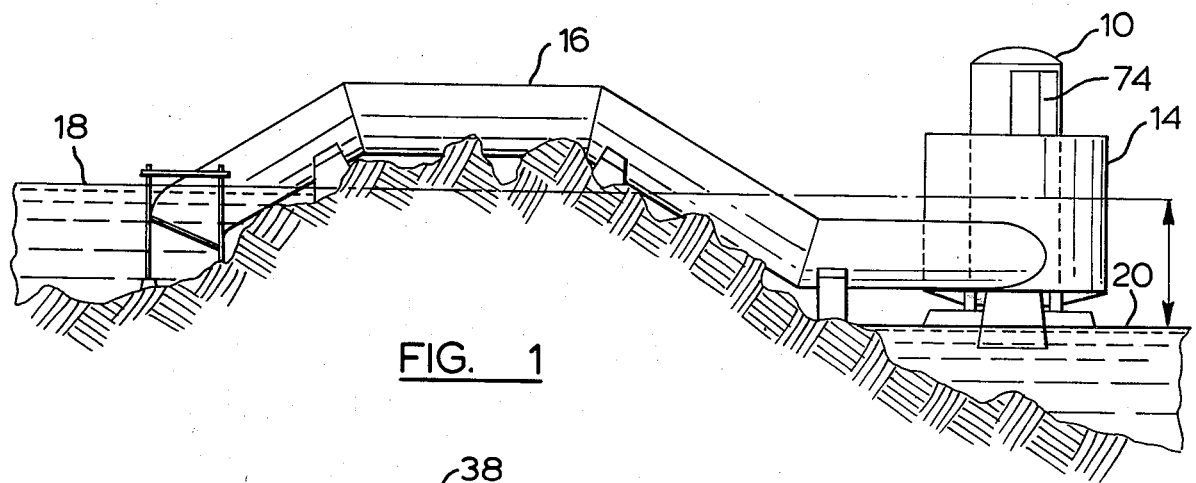
FIG. 1 is a schematic illustration of a hydro-electric generating station according to this invention.
Figure 3:
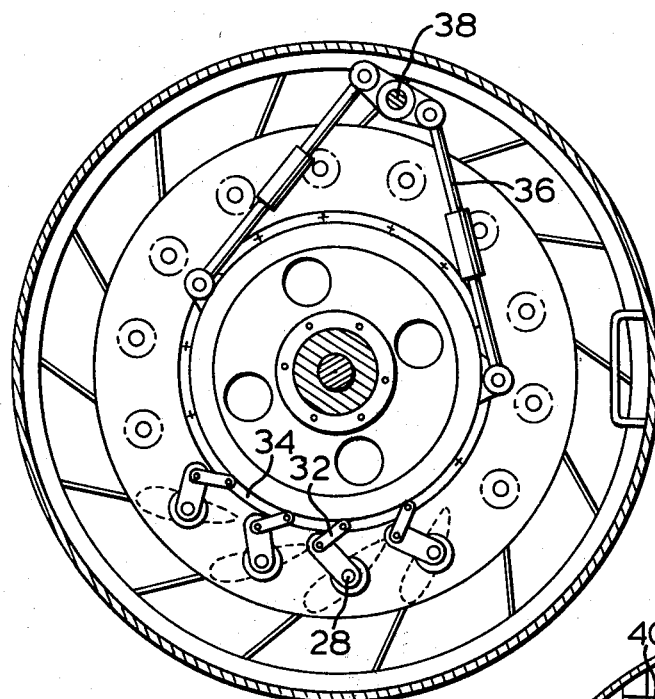
FIG. 3 is a horizontal section through the station at the line 3—3 of FIG. 2.
Figure 4:
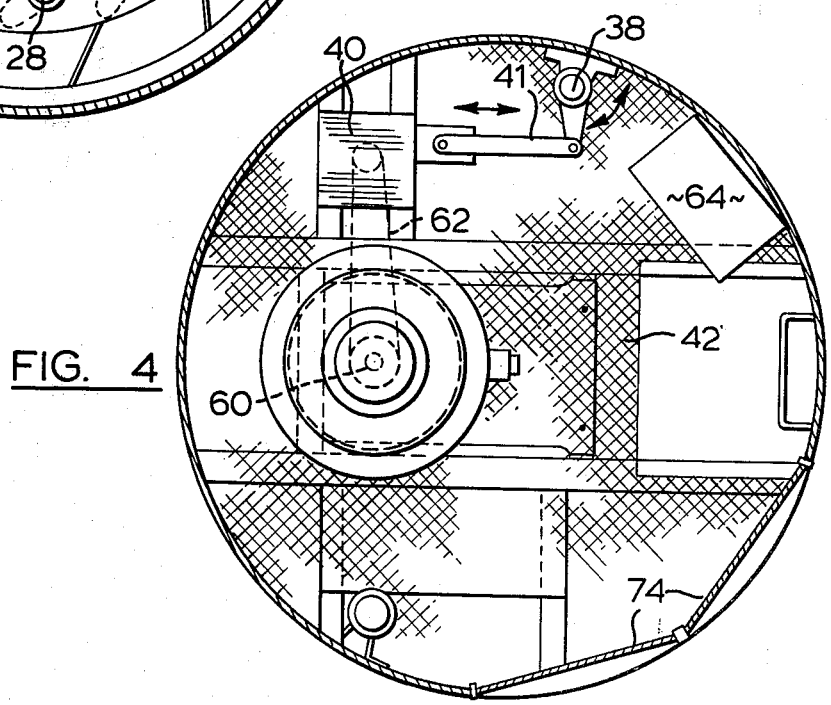
FIG. 4 is a horizontal section through the station at the line 4—4 of FIG. 2.

FIG. 1 is an illustration of a typical installation of a hydro generating station made in accordance with this invention. The station 10 is mounted on a rigid base in the tail water 20 and is surrounded by an open flume 14 that is connected by means of a closed conduit 16 to the head water 18. The gross head, the difference in elevation between the head water 18 and the tail water 20 is relatively small. The best applications for the hydro-electric generating stations of this invention will be used on gross heads of between 7 and 25 feet.

Figure 2:
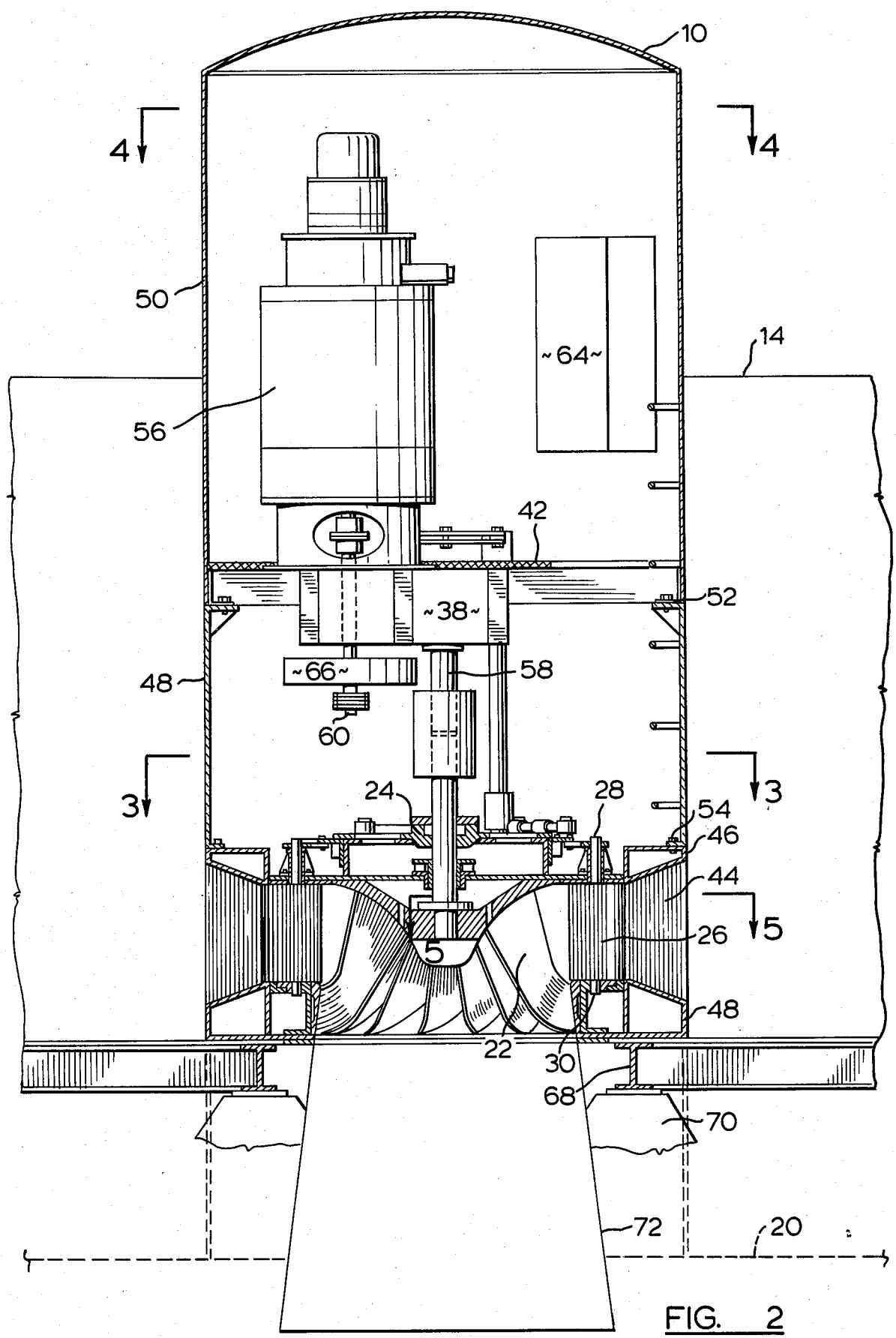
FIG. 2 is a vertical section of the generating station.
Figure 5:
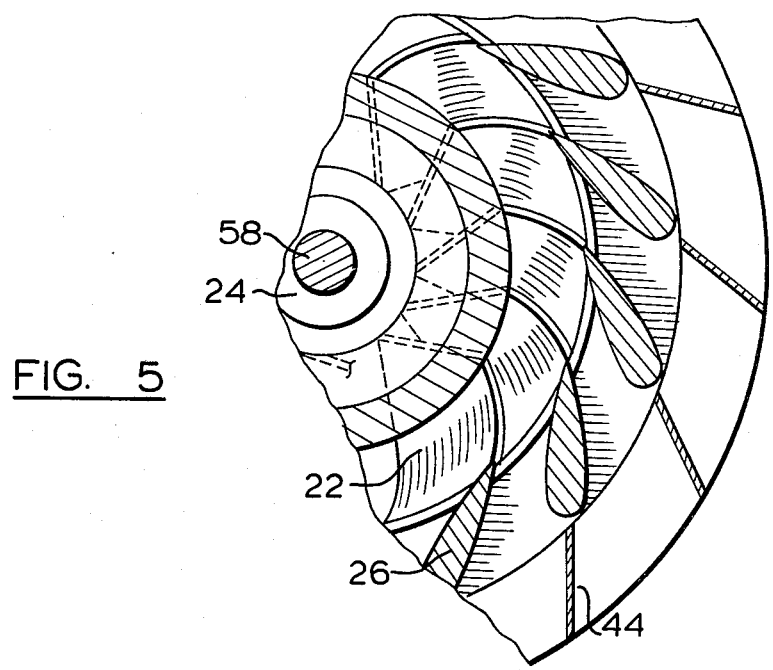
FIG. 5 is a section taken along the line 5—5 of FIG. 2.

FIG. 2 is an enlarged vertical section through the hydro-electric generating station 10. The station includes a vertical turbine with a Francis runner 22 of standard design journalled in the turbine guide bearing as at 24. Immediately surrounding the runner is the distributor which comprises a series of wicket gates 26 equally spaced around the circumference and mounted on shafts 28 and 30 at their ends. Shafts 28 are connected through linkages 32 to ring 34 which is rotatable through links 36 in response to rotation of the governor shaft 38. The governor 40 is mounted on the deck 42 in the upper part of the station housing and will be referred to later. Vertically extending stayvanes 44 extend between stayvane rings 46 and 48.

The turbine, the generator and the associated running gear for the generation of electrical power are not of themselves new. This invention is concerned with the construction of the generating station as a whole and in this connection the housing for the generator and associated running gear for generating electrical power are mounted on the upper stayvane ring 46. The housing comprises two flanged tubular sections of steel wall 48 and 50 bolted together at abutting flanges as at 52 and bolted onto the upper stayvane ring at a flange as at 54. The deck 42 extends across the housing at the juncture of the two sections and beams extend across the housing at the juncture to support the generator 56 and its associated running gear. The turbine shaft 58 extends upwardly from the bearing 24 to the gear box 38 of the generator 56. The generator shaft 60 connects with the governor 40 through drive belt 62. Numeral 64 is a schematic illustration of a control box for the unit. Numeral 66 is a fly wheel on the generator shaft. The governor control arm 41 reciprocates as required to turn shaft 38 and operate the wicket gates 26 to control the water admitted to the runner as required in use.

The generator 56, governor 40, controls 64 and turbine are all of standard design and not described in detail in this application. Of importance is the manner in which these elements are mounted within the housing 10 and the disposition of the housing on the upper stayvane ring 46 of the turbine. It will be noted that the upper stayvane ring of the turbine provides vertical, lateral and torsional support for the housing, the generator and associated running gear that is mounted in the housing.

With this construction it is possible to completely shop assemble the station prior to delivery to its site whereby revolving verification of the rotating elements and wiring and controls can be shop completed. This brings to a minimum the field commissioning requirements.

The turbine has an outside diameter of about feet so that the completed station is road and load transportable within regulatory limits.

In use the station is mounted on beams 68 which rest on concrete pads 70 in the tail water 20. The flume 14 is similarly supported. Numeral 72 refers to a draft tube that extends from the runner down into the tail water.

In the embodiment of the invention illustrated doors 74 into the upper section of the housing open from a deck over the flume.

In use, the turbine, generator, associated running gear and housing are assembled and aligned. They can then be shipped bodily to the site and mounted at the tail water according to standard turbine mounting practice. There is no necessity to align the generator with the turbine location, nor is there any necessity to electrically connect the generator and its running gear at the site location. These things can be accomplished with a hydro-electric generating station according to this invention at the shop and their accomplishment at the shop location where skilled help is readily available materially reduces the cost of installing a small generating station, especially at a remote location.

The embodiment of the invention illustrated has a diameter of about eight and one-half feet and a height of about twenty feet excluding the draft tube. The power generated from such a unit will depend on the head. A head of about nine feet should provide an output of 94 kilowatts and a head of 25 feet should provide an output of about 436 kilowatts.

Embodiments of the invention other than the one illustrated will be apparent to those skilled in the art and it is not intended that the foregoing description should be read in a limiting sense.

The embodiments of the invention in which an exclusive property or privilege is claimed are defined as follows:

1. A prefabricated hydro-electric generating station comprising;
    a vertical turbine having a Francis runner with its axis of rotation in a vertical direction, a distributor and upper and lower horizontally disposed stayvane rings with stayvanes extending therebetween;
    a generator and associated running gear for generating electrical power operatively connected to the Francis runner;
    a housing with means for entry by an attendant having walls supported on said upper horizontally disposed stayvane ring of said turbine and enclosing said generator and associated running gear;
    said upper horizontally disposed stayvane ring of said turbine underlying said housing, generator and associated running gear and providing vertical, lateral and torsional support for said housing generator and associated running gear mounted in said housing;
    said lower stayvane ring being adapted for mounting on a base to support said hydro-electric generating station in an operative position.

2. A prefabricated hydro-electric generating station as claimed in claim 1 in which said walls of said housing are tubular steel.

3. A prefabricated hydro-electric generating station comprising:
    a vertical turbine having a Francis runner with its axis of rotation in a vertical direction, a distributor and upper and lower horizontally disposed stayvane rings with stayvanes extending therebetween;
    a generator and associated running gear for generating electrical power operatively connected to the Francis runner;
    a housing with means for entry by an attendant having walls supported on said upper horizontally disposed stayvane ring of said turbine and enclosing said generator and associated running gear;
    said upper horizontally disposed stayvane ring of said turbine underlying said housing, generator and associated running gear and providing vertical, lateral and torsional support for said housing generator and associated running gear;
    said lower stayvane ring being adapted for mounting on a base to support said hydro-electric generating station in an operative position and in which said housing has a floor overlying said turbine, said generator and associated running gear being mounted on said floor.

4. A prefabricated hydro-electric generating station comprising:
    a vertical turbine having a Francis runner, a distributor and upper and lower stayvane rings with stayvanes extending therebetween;
    a generator and associated running gear for generating electrical power operatively connected to the Francis runner;
    a housing having walls mounted on said upper stayvane ring of said turbine and supporting said generator and running gear;
    said upper stayvane ring of said turbine providing vertical, lateral and torsional support for said housing generator and associated running gear mounted in said housing;
    said lower stayvane ring being rigidly mounted on a base to support said hydro-electric generating station in an operative position.

5. A prefabricated hydro-electric generating station as claimed in claim 4 in which said walls of said housing are tubular steel.

6. A prefabricated hydro-electric generating station as claimed in claim 5 in which said housing has a floor overlying said turbine, said generator and associated running gear being mounted on said floor.

* * * * *